UNITED STATES PATENT OFFICE.

EDWARD J. DE SMEDT, OF WASHINGTON, DISTRICT OF COLUMBIA, ASSIGNOR OF ONE-FOURTH TO JAMES M. WILCOX, OF PHILADELPHIA, PA.

ART OF MANUFACTURING PORTLAND CEMENT.

SPECIFICATION forming part of Letters Patent No. 279,357, dated June 12, 1883.

Application filed April 3, 1883. (No specimens.)

*To all whom it may concern:*

Be it known that I, EDWARD J. DE SMEDT, of the city of Washington, in the District of Columbia, have invented certain new and useful Improvements in the Manufacture of Portland Cement, of which the following is a specification.

In the production of Portland cement from argillo-magnesian and argillo-calcareous cement-rocks and hydraulic limestones it has been customary heretofore first of all to reduce the natural rock to a comminuted or finely-divided condition by a suitable machine. The powdered mass thus obtained is subsequently mixed with sufficient water to produce a paste, which is made into bricks, balls, or other forms, dried, calcined, and ground for use.

The preliminary step of first reducing the natural rock to powder before subjecting it to further treatment is disadvantageous and objectionable in many respects. The natural rock is hard and difficult to reduce, and consequently the grinding or reducing machinery soon becomes damaged and worn, and mill-stones, which form a part of the machinery, require to be frequently renewed, which is a source of considerable expense. Moreover, about fifty per cent. only in weight of the natural rock is available for cement-making purposes or enters into the cement which is finally produced, so that in transporting the rock from the quarry to the mill a considerable of earth or useless material must necessarily be handled, and the calcining operation is necessarily comparatively tedious and slow, and consequently expensive. I find that all these disadvantages can be obviated by first calcining the rock or raw material before grinding it. The effect of the preliminary calcining operation is to drive off from the rock that portion of its constituents which are not useful for cement-making purposes, and also to put in a condition in which it can be ground with comparative ease and with much less wear and tear of machinery. If, as is usually the case, the reducing-mills are located some distance from the quarry, it will be seen that by calcining the rock at the quarry, as can readily be done without much expense, the weight of the material to be carried to the mill will be reduced about one-half, thus saving a very considerable expense in transportation.

In carrying out my invention I proceed as follows: I take the rock or raw material before grinding and I calcine it in order to expel from it the moisture and carbonic acid. After calcination the rocks are reduced to a powder, which, if suitable in itself for the production of Portland cement, is made into paste, dried again, calcined, and ground, and packed in barrels in accordance with the ordinary process of manufacture; or the process of manufacture described in my Patent No. 274,288, of March 20, 1883, may be adopted. If the powder is not adapted without the addition of other ingredients to make Portland cement, lime or dolomite can be added to it in the manner indicated in my Letters Patent Nos. 274,734 and 274,735, of March 27, 1883.

The advantages which my invention possesses over the methods of manufacture heretofore employed may be more particularly stated as follows: Carbonate of lime enters into the composition of natural rocks suitable for the production of Portland cement to the extent of about seventy per cent. and is composed of—

Carbonic acid ($CO_2$)............................. 44
Lime (CaO)........................................ 56
                                                  ———
Total.........................................100

Consequently by calcining the natural rock prior to the grinding operation, and thus expelling from it the carbonic acid, water, and organic matter, which amount to about fifty per cent. of the mass, I reduce the quantity to be ground and subsequently treated to the minimum. I thus avoid the handling and final calcination of about half of the raw material; and, inasmuch as the carbonic acid, &c., have been driven off by the preliminary calcination, the final calcination can be accomplished in about one-third of the time which is required under ordinary processes, the only object of the final calcination in my process being to produce the Portland-cement clinker—that is, to submit the material to a heat which produces the vitrifaction on the outside of the cakes or balls into which the cement-paste is formed; and this heat can be applied under my process more quickly than under the ordinary processes, and without that degree of care that is required in the latter. Furthermore, by the preliminary calcination of the raw rock its cohesion is materially reduced, and it is brought to a condition in which it can be readily and quickly ground with much less wear upon the machinery used for that purpose. Finally, the material is put in better condition and yields a decidedly superior quality of Portland cement.

Having now described my invention, what I claim, and desire to secure by Letters Patent, is—

The improvement in the art of making Portland cement, which consists in first calcining the raw or natural rock to be used in the manufacture of the cement, then grinding or reducing the same to a powdered or comminuted condition, then forming a cement-paste therefrom, and finally recalcining and regrinding the same, substantially as and for the purposes hereinbefore set forth.

In testimony whereof I have hereunto set my hand this 29th day of March, 1883.

E. J. DE SMEDT.

Witnesses:
J. WALTER BLANDFORD,
E. A. DICK.